(12) United States Patent
Liu et al.

(10) Patent No.: US 10,886,827 B2
(45) Date of Patent: Jan. 5, 2021

(54) LINEAR VIBRATION MOTOR

(71) Applicant: Goertek Inc., Weifang (CN)

(72) Inventors: Chunfa Liu, Weifang (CN); Fenglei Zu, Weifang (CN)

(73) Assignee: Goertek Inc., Weifang (CN)

( * ) Notice: Subject to any disclaimer, the term of this patent is extended or adjusted under 35 U.S.C. 154(b) by 194 days.

(21) Appl. No.: 15/778,676

(22) PCT Filed: Jun. 3, 2016

(86) PCT No.: PCT/CN2016/084791
§ 371 (c)(1),
(2) Date: May 24, 2018

(87) PCT Pub. No.: WO2017/088442
PCT Pub. Date: Jun. 1, 2017

(65) Prior Publication Data
US 2018/0351442 A1 Dec. 6, 2018

(30) Foreign Application Priority Data

Nov. 25, 2015 (CN) .......................... 2015 1 0835647

(51) Int. Cl.
*H02K 33/02* (2006.01)
*H02K 33/16* (2006.01)
*H02K 33/14* (2006.01)

(52) U.S. Cl.
CPC .............. *H02K 33/02* (2013.01); *H02K 33/14* (2013.01); *H02K 33/16* (2013.01)

(58) Field of Classification Search
CPC ........ H02K 33/02; H02K 33/18; H02K 33/14; H02K 33/00; H02K 33/16; H02K 11/00;
(Continued)

(56) References Cited

U.S. PATENT DOCUMENTS

| 6,039,639 A * | 3/2000 | Pfaundler | .............. B24B 23/04 451/351 |
| 2003/0127918 A1* | 7/2003 | Fukunaga | .............. H02K 33/16 310/36 |

(Continued)

FOREIGN PATENT DOCUMENTS

| CN | 201750320 U | 2/2011 |
| CN | 201750321 U | 2/2011 |

(Continued)

OTHER PUBLICATIONS

International Searching Authority, International Search Report (ISR) and Written Opinion for International Application No. PCT/CN2016/084791, dated Sep. 7, 2016, 13 pages, State Intellectual Property Office of the P.R.C., China.

*Primary Examiner* — Tran N Nguyen
(74) *Attorney, Agent, or Firm* — Alston & Bird LLP

(57) ABSTRACT

A linear vibration motor comprising a housing, a stator, an vibrator, and two sets of elastic support assemblies which are located at two ends of the vibrator, respectively, and used for supporting the vibrator and providing elastic restoring forces, wherein each set of the elastic support assemblies comprises at least two elastic supports. Each elastic support comprises a first connection point coupled to the vibrator and a second connecting point coupled to the housing. both the first connection point and the second connection point which are located on the same elastic support are located on the same side of a central axis of the vibrator, and the central axis is parallel to a vibration direction of the vibrator; and the second connection point is coupled onto a side wall, perpendicular to the vibration direction of the vibrator, of the housing. The linear vibration motor of the present invention has a simple structure, is low in assembly difficulty and high in production efficiency.

11 Claims, 3 Drawing Sheets

(58) Field of Classification Search
CPC . H02K 11/20; H02K 7/00; H02K 7/06; H02K 7/065; B06B 1/00; B06B 1/04; B06B 1/045; G06F 3/00; G06F 3/01; G06F 3/016
USPC .................................. 310/15, 17, 25, 28, 29
See application file for complete search history.

(56) References Cited

U.S. PATENT DOCUMENTS

| | | | |
|---|---|---|---|
| 2011/0101797 A1 | 5/2011 | Lee et al. | |
| 2011/0280433 A1* | 11/2011 | Park | H02K 33/16 381/433 |
| 2012/0049660 A1* | 3/2012 | Park | B06B 1/045 310/25 |
| 2012/0104875 A1* | 5/2012 | Park | H02K 33/16 310/25 |
| 2012/0112565 A1* | 5/2012 | Lee | B06B 1/045 310/20 |
| 2012/0169148 A1* | 7/2012 | Kim | H02K 33/16 310/25 |
| 2012/0169151 A1* | 7/2012 | Dong | H02K 33/16 310/25 |
| 2012/0187780 A1* | 7/2012 | Bang | H02K 33/16 310/25 |
| 2012/0227269 A1* | 9/2012 | Subramanian | B26B 19/282 30/210 |

FOREIGN PATENT DOCUMENTS

| | | |
|---|---|---|
| CN | 102055298 A | 5/2011 |
| CN | 102570764 A | 7/2012 |
| CN | 103401394 A | 11/2013 |
| CN | 105406678 A | 3/2016 |
| CN | 205178817 U | 4/2016 |

* cited by examiner

LINEAR VIBRATION MOTOR

CROSS-REFERENCE TO RELATED APPLICATIONS

This application is a National Stage of International Application No. PCT/CN2016/084791, filed on Jun. 3, 2016, which claims priority to Chinese Patent Application No. 201510835647.0, filed on Nov. 25, 2015, both of which are hereby incorporated by reference in their entireties.

BACKGROUND

Technical Field

The present invention relates to the technical field of miniature motors, and in particular, to a linear vibration motor.

Description of Related Art

As one type of motors, a linear vibration motor with a horizontal vibration direction is mostly used in portable electronic products such as a mobile phone, a handheld game machine and a handheld multimedia entertainment device. The linear vibration motor usually comprises a housing, a stator and a vibrator. The stator comprises coils and magnetic conduction cores which are fixed on the housing. The vibrator comprises permanent magnets corresponding to the coils and the magnetic conduction cores in a perpendicular direction, and a mass block which is fixed integrally to the permanent magnets. The motor further comprises two elastic supports which are respectively arranged at two ends of the vibrator and are used for supporting the vibrator and providing elastic restoring forces in the horizontal direction.

Existing elastic supports are mostly elastic sheets or springs. The elastic sheet and the spring each only have two connection points, one being connected to the vibrator and the other being connected to the housing. Since the vibrator has certain dimensions in length, width and height and also has a certain weight, the structure of the existing elastic support and a connection mode thereof to the vibrator and the housing make it difficult to ensure the vibration balance of the vibrator. As a result, the polarized vibration is easily caused and the performance of the linear vibration motor is affected. In order to solve the technical problem of polarized vibration of the vibrator, a skilled person adds a positioning shaft on the vibrator. Although this method solves the technical problem of polarized vibration of the vibrator, the motor becomes more complex in structure and is higher in assembly difficulty. It is difficult to implement this method with continuous decrease of the motor volume. In addition, the addition of the positioning shaft also reduces the volume and weight of a mass block. Consequently, the resonant frequency of the motor is increased, the low frequency performance of the motor is reduced, and thus the improvement on the overall performance of the motor is seriously affected.

BRIEF SUMMARY

Regarding the above defects, the technical problem to be solved by the present invention is to provide a linear vibration motor which has a simple structure, is low in assembly difficulty, does not generate polarized vibration, and is better in low frequency performance and high in overall performance.

In order to solve the above technical problem, the technical solution of the present invention is as below.

A linear vibration motor comprises a housing, a stator and a vibrator, and further comprises at least two sets of elastic support assemblies which are located at two ends of the vibrator, respectively, and used for supporting the vibrator and providing elastic restoring forces, wherein: each set of the elastic support assemblies comprises at least two elastic supports, and each of the elastic supports comprises a first connection point coupled to the vibrator and a second connection point coupled to the housing; both the first connection point and the second connection point which are located on the same elastic support are located on the same side of a central axis of the vibrator, and the central axis is parallel to a vibration direction of the vibrator; and the second connection point is coupled onto a side wall, perpendicular to the vibration direction of the vibrator, of the housing.

Optionally, the first connection point is coupled onto a side wall, perpendicular to the vibration direction of the vibrator, of the vibrator or the first connection point is coupled onto a side wall, parallel to the vibration direction of the vibrator, of the vibrator.

Optionally, the elastic supports are elastic sheets or springs.

Optionally, each set of the elastic support assemblies comprises the two elastic supports which have the same structure and are stacked; the state of one elastic support is the state in which the other elastic support is turned around the central axis by 180 degrees; and a make-way space is reserved between the two elastic supports.

Optionally, the elastic support comprises two elastic arms both located on the same side of the first connection point and the second connection point.

Optionally, one ends of the two elastic arms are integrally connected, and the other ends of the two elastic arms are respectively coupled to the first connection point and the second connection point; an included angle between the two elastic arms is an acute angle; and the two elastic arms have the same structure and are symmetrically arranged.

Optionally, the elastic arm is of a bending structure, and two ends of the elastic arm are respectively located in two different planes in a longitudinal direction.

Optionally, the elastic arm comprises a first half arm and a second half arm which are connected together, and the first half arm and the second half arm are connected together in a vertically stacked manner at an interconnection portion of the first half arm and the second half arm.

Optionally, connection ends of the two elastic arms are fixedly coupled by welding.

Optionally, the height and width of the elastic support assembly are identical with those of the vibrator.

Optionally, the elastic support is made of a wire of a flat structure, and the longitudinal width of the wire is greater than the transverse width of the wire.

Optionally, a damping element is arranged in a space defined by the elastic supports of the same set of elastic support assemblies.

Optionally, the vibrator comprises at least two adjacent permanent magnets and a magnetic conduction yoke arranged between the two adjacent permanent magnets, adjacent ends of the two adjacent permanent magnets have the same polarity; the stator comprises coils and magnetic conduction cores arranged in the coils; and a magnetization direction of the permanent magnet is perpendicular to an axis of the coil.

Optionally, the magnetic conduction yoke and the magnetic conduction core are staggered; and a horizontal distance between the magnetic conduction yoke and the magnetic conduction core corresponding to the magnetic conduction yoke is 0.1-0.3 mm.

By adopting the above technical solution, the present invention has the following beneficial effects.

The linear vibration motor of the present invention comprises at least two sets of elastic support assemblies, wherein each set of the elastic support assemblies comprises at least two elastic supports; each of the elastic supports comprises a first connection point coupled to the vibrator and a second connection point coupled to the housing; both the first connection point and the second connection point which are located on the same elastic support are located on the same side of a central axis of the vibrator, and the second connection point is coupled onto a side wall, perpendicular to the vibration direction of the vibrator, of the housing. By adopting such a structure, the elastic support assembly at least has two connection points to each of the vibrator and the housing, and the connection points coupled to the vibrator are opposite to the connection points coupled to housing. When the present invention is compared with the prior art, by adopting such a structure, the force receiving uniformity of the vibrator may be effectively increased and a better support force is provided for the vibrator. Therefore, the vibration stability and balance of the vibrator are improved. The vibrator does not produce polarized vibration during vibration and thus there is no need of adding the positioning shaft to balance the vibrator. Hence, for the motor, the structure is simplified, the assembly difficulty is reduced and the production efficiency is improved. Moreover, the volume of the mass block may be larger. Accordingly, the resonant frequency of the motor is effectively reduced, and the low frequency performance of the motor is improved. Thus, the overall performance of the motor is higher.

The two elastic supports in the same set of elastic support assemblies have the same structure and are stacked; the state of one elastic support is the state in which the other elastic support is turned around the central axis by 180 degrees; and a make-way space is reserved between the two elastic supports. With such an arrangement mode of the two elastic supports, the two elastic supports are symmetrical in both a longitudinal direction and a transverse direction, thereby providing the better support forces and elastic restoring forces for the vibrator. Hence, the elastic restoring forces received by the vibrator is more uniform, and the polarized vibration of the vibrator is further prevented. Therefore, the vibration stability and balance of the vibrator are improved.

The elastic support is made of a wire of a flat structure, and the longitudinal width of the wire is greater than the transverse width of the wire, that is, the material of the elastic supports is of a sheet structure, and the sheet material is arranged longitudinally. Such a design structure may better support the vibrator in the longitudinal direction and bear the weight of the vibrator. Hence, the polarized vibration of the vibrator is further prevented, and the thus vibration stability and balance of the vibrator are improved. Therefore, the overall performance of the motor is improved.

The damping element is arranged in the space defined by the elastic supports of the same set of elastic support assemblies, and produces a compression and restoring force with the vibration of the vibrator when the vibrator vibrates, thereby achieving a damping effect. The damping element may provide certain assistance in a restoring process of the elastic support, shorten the vibration return time of the vibrator and realize rapid reciprocating movement of the vibrator. Thus, the performance of the motor is further improved. Moreover, the vibrator is effectively prevented from collision with the housing. Thus, for the motor, the stability is improved and the service life is prolonged.

In summary, the liner vibration motor of the present invention solves the technical problems of complex structure, poor low-frequency performance and the like of the linear vibration motor in the prior art. The linear vibration motor of the present invention has a simple structure, is low in assembly difficulty, high in production efficiency, good in vibration stability and balance, high in low-frequency performance, good in overall performance and long in service life.

In the figures, the reference signs represent the following components: 10-upper housing; 12-lower housing; 20-first coil; 22-second coil; 24-magnetic conduction core; 26-coil skeleton; 30-mass block; 32-first permanent magnet; 34-magnetic conduction yoke; 36-second permanent magnet; 40a-elastic support assembly; 40b-elastic support assembly; 42-elastic support; 420-first connection point; 422-second connection point; 424-first elastic arm; 426-second elastic arm; 46-elastic support; 460-first elastic arm; 462-second elastic arm; 464-first connection point; 466-second connection point; 467-first half arm; 468-second half arm; 469-folding connection point; 50 damping element.

DETAILED DESCRIPTION OF THE VARIOUS EMBODIMENTS

The present invention is further described below with reference to the drawings and embodiments.

In this description, the orientation refers to the orientation in which the motor works normally. In this description, the term "inner side" refers to the side close to the center of the linear vibration motor, and the term "outer side" refers to the side far from the center of the linear vibration motor.

Embodiment One

As shown in FIGS. 1-4, a linear vibration motor is of a cuboid structure and comprises a housing, a stator, a vibrator and at least two sets of elastic support assemblies 40*a* which are located at two ends of the vibrator, respectively, and used for supporting the vibrator and providing elastic restoring forces. Each set of the elastic support assemblies 40*a* comprises at least two elastic supports 42. The elastic supports 42 are elastic sheets or springs. The housing comprises an upper housing 10 and a lower housing 12 which are coupled together. The upper housing 10 is of a box-shaped structure with one open end. The lower housing 12 is of a plate-like structure. The open end of the upper housing 10 is buckled on the lower housing 12. The stator is fixed on the upper housing 10 and the lower housing 12. The vibrator is suspended, through the elastic support assemblies 40*a*, in a space defined by the upper housing 10 and the lower housing 12.

Figure 1:
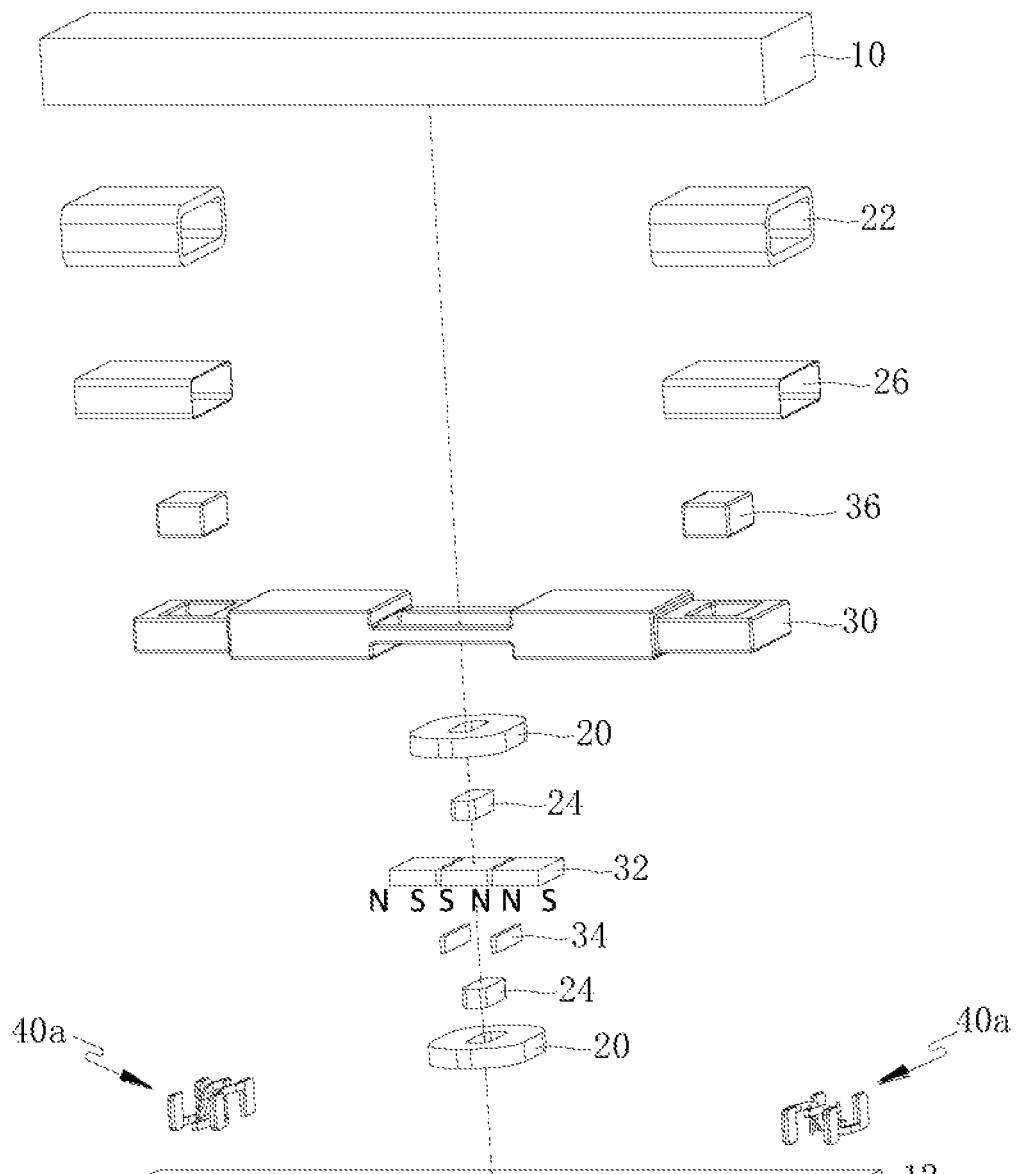
FIG. 1 is an exploded schematic structural view of Embodiment One of the linear vibration motor of the present invention.
Figure 2:
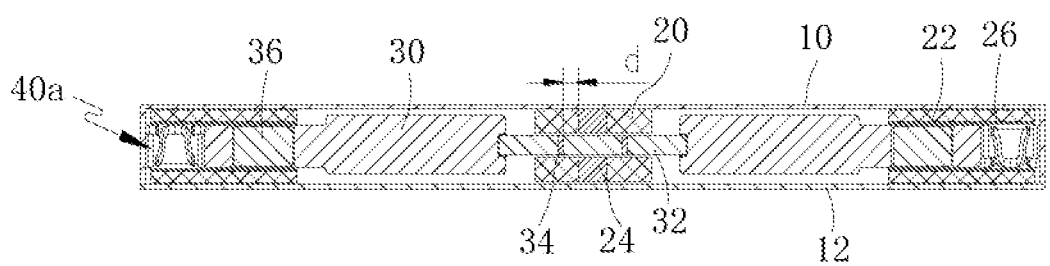
FIG. 2 is a longitudinal sectional view of Embodiment One of the linear vibration motor of the present invention.
Figure 3:
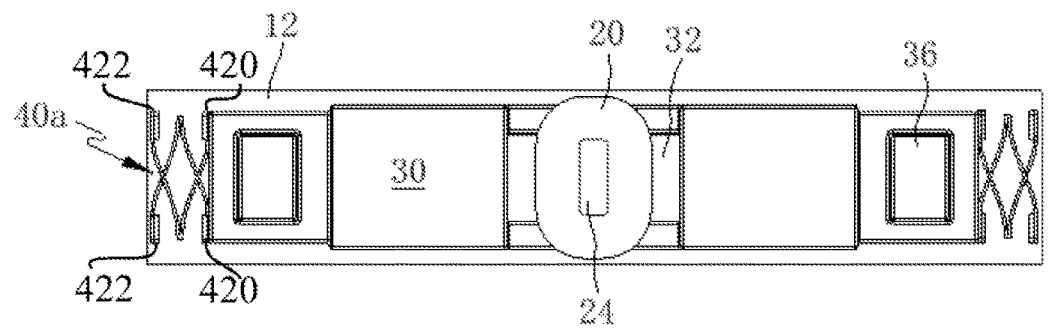
FIG. 3 is an internal schematic structural view of Embodiment One of the linear vibration motor of the present invention.

As shown in FIGS. 1-3, the vibrator comprises a mass block 30. At least two first permanent magnets 32 which are adjacent in a horizontal direction are fixed in a center position of the mass block 30. In this embodiment, preferably, there are three first permanent magnets 32. A magnetic conduction yoke 34 is arranged between two adjacent permanent magnets 32. Adjacent ends of the two adjacent permanent magnets 32 have the same polarity. By taking the three first permanent magnets 32 as an example, their polarities are N, S; S, N; N, S or S, N; N, S; S, N, that is, a magnetisation direction of each of the first permanent magnets 32 is the same as a vibration direction of the vibrator. A second permanent magnet 36 is embedded at each of two ends of the mass block 30. A set of elastic support assemblies 40*a* is arranged at each of the two ends of the mass block 30. The vibrator is suspended, through these two sets of elastic support assemblies 40*a*, in the space defined by the upper housing 10 and the lower housing 12.

As shown in FIGS. 1-3, the stator comprises first coils 20 vertically arranged on an upper side and a lower side of the three first permanent magnets 32 respectively and each being of a flat structure. A magnetic conduction core 24 is arranged in the center of each of the two first coils 20. An axis of the first coil 20 is perpendicular to the magnetization direction of the first permanent magnet 32. The first coil 20 and the magnetic conduction core 24 which are located above the first permanent magnet 32 are fixed on an inner side of the upper housing 10. The first coil 20 and the magnetic conduction core 24 which are located below the first permanent magnet 32 are fixed on an inner side of the lower housing 12. The stator further comprises two second coils 22 which are fixed at two ends of the motor and are of cylindrical structures. The two second coils 22 are transversely arranged. Coil skeletons 26 of the cylindrical structure are arranged on inner sides thereof and achieve the effect of supporting the second coils 22. The second coil 22 surrounds the periphery of the coil skeleton 26. The coil skeleton 26 surrounds peripheries of ends of the elastic support assembly 40*a*, the second permanent magnet 36 and the mass block 30. When the motor works, an alternating current is introduced to the first coils 20 and the second coils 22 and under the interaction of the first permanent magnets 32, the first coils 20 and the magnetic conduction cores 24 and the action of the second coils 22 and the second permanent magnets 36, the vibrator performs reciprocating vibration along the horizontal direction to generate vibration.

As shown in FIG. 2, in this embodiment, one first coil 20 is arranged on each of the upper side and the lower side of the first permanent magnets 32, but in practical application, the number of the first coils 20 located on one side of the first permanent magnets 32 is not limited to one. Of course, one magnetic conduction core 24 is arranged at the center of each of the first coils 20. The magnetic conduction yoke 34 and the magnetic conduction core 24 which are arranged between the two adjacent first permanent magnets 32 are staggered. A horizontal distance d between the magnetic conduction yoke 34 and the magnetic conduction core 24 corresponding to the magnetic conduction yoke is 0.1-0.3 mm.

As shown in FIGS. 1-4, in this embodiment, preferably, a set of elastic support assemblies 40*a* is arranged at each of the two ends of the vibrator. Each set of the elastic support assembly 40*a* comprises two elastic supports 42 having the same structure. The elastic supports 42 are elastic sheets. Each of the elastic supports 42 comprises a first connection point 420 coupled to the mass block 30 and a second connection point 422 coupled to an inner side wall of the upper housing 10, and further comprises a first elastic arm 424 and a second elastic arm 426 which have the same structure and are symmetrically arranged. One end of the first elastic arm 424 is coupled to the first connection point 420 and the other end thereof is integrally connected to one end of the second elastic arm 426. The other end of the second elastic arm 426 is coupled to the second connection point 422. The first elastic arm 424 and the second elastic arm 426 may be formed by bending one elastic sheet and may also be formed by integrally welding two elastic sheets. Furthermore, both the first elastic arm 424 and the second elastic arm 426 are located on the same side of the first connection point 420 and the second connection point 422. The first elastic arm 424 and the second elastic arm 426 form an included angle at a connection position. In this embodiment, preferably, the included angle is an acute angle, that is, the whole elastic support 42 is approximately V-shaped when viewed from above. The first elastic arm 424 (the second elastic arm 426) is of a bending structure. Two ends of the first elastic arm 424 (the second elastic arm 426) are respectively located in two different planes in a longitudinal direction, that is, the first elastic arm 424 (the second elastic arm 426) is approximately S-shaped when viewed laterally. The height (longitudinal dimension) of both the first connection point 420 and the second connection point 422 is identical with the height of the first elastic arm 424 and the second elastic arm 426. The longitudinal wire width of both the first elastic arm 424 and the second elastic arm 426 is less than the height of the first connection point 420 and the second connection point 422.

Figure 4:
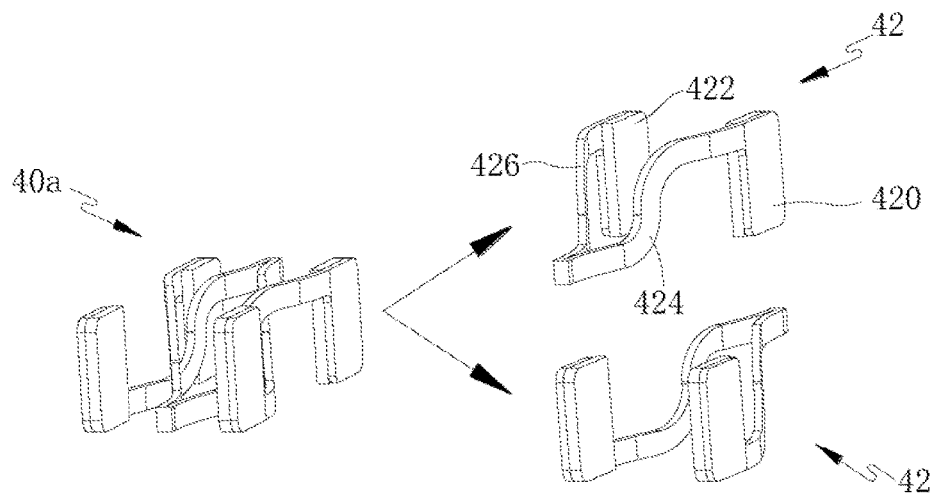
FIG. 4 is a schematic structural view of the elastic support assembly in FIG. 1.

As shown in FIG. 4, the elastic support 42 is made of a wire being of a flat structure and being arranged longitudinally, that is, the longitudinal width of the elastic arm made of the wire is greater than the transverse width of the elastic arm. By adopting such a structure, the strength of the elastic support 42 in the longitudinal direction can be increased, so as to better bear the weight of vibrator. Therefore, the vibration stability and balance of the vibrator are improved.

As shown in FIGS. 3 and 4, the first connection point 420 and the second connection point 422 which are located on the same elastic support 42 are located on the same side of a central axis of the vibrator. The central axis is a central axis parallel to the vibration direction of the vibrator. The first connection point 420 is coupled at an end of the mass block 30, which comprises an end surface (a side wall perpendicular to the vibration direction of the mass block) and a side surface (a side wall parallel to the vibration direction of the mass block) of the mass block 30. The connection point 422 is coupled to a side wall, perpendicular to the vibration direction of the vibrator, of the upper housing 10.

As shown in FIGS. 3 and 4, the two elastic supports 42 in the same elastic support assembly 40a are stacked vertically. If the state of one elastic support 42 is a reference state, the state of the other elastic support 42 is a state in which the elastic support in the reference state is turned around the central axis of the vibrator by 180 degrees. The central axis is likewise the central axis parallel to the vibration direction of the vibrator. After assembly, the two elastic supports 42 are symmetrical in both the longitudinal direction and the transverse direction, that is, the two elastic supports 42 are not only symmetrical vertically, but also symmetrical in the front-rear direction. Moreover, S-shaped elastic arms of the two elastic supports 42 can form a make-way space therebetween, thereby ensuring that the two elastic supports 42 do not interfere with each other during vibration of the vibrator. By adopting such a structure, it may be ensured that the two first connection points 420 coupled onto the mass block 30 are respectively coupled to two sides of the end surface of the mass block 30, and the two second connection points 422 coupled onto the upper housing 10 respectively correspond to the two corresponding first connection points 420. Therefore, it may be further ensured that the polarized vibration of the vibrator does not occur, and thus the stability and balance of the vibrator are better.

As shown in FIGS. 2-4, if the height of the elastic support assembly 40a is identical with the height of the end of the mass block 30, the height of both the first connection points 420 and the second connection points 422 is identical with the height of the end of the mass block 30. Moreover, the width (i.e., a dimension perpendicular to the vibration direction of the vibrator) of the elastic support assembly 40a is identical with the width of the end of the mass block 30. By adopting such a structure, the coupling firmness between the elastic support assemblies 40a and the mass block 30 as well as the upper housing 10 may be improved and the force receiving uniformity of the vibrator may be improved. Thus, the service life of the motor is prolonged and the vibration stability and balance of the vibrator may be further improved.

Embodiment Two

This embodiment is basically the same as Embodiment One, except the followings.

Figure 5:
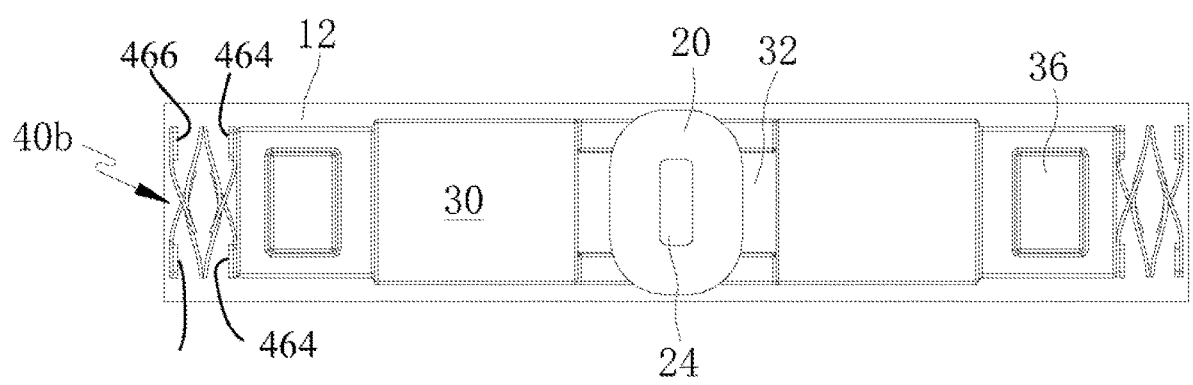
FIG. 5 is an internal schematic structural view of Embodiment Two of the linear vibration motor of the present invention.
Figure 6:
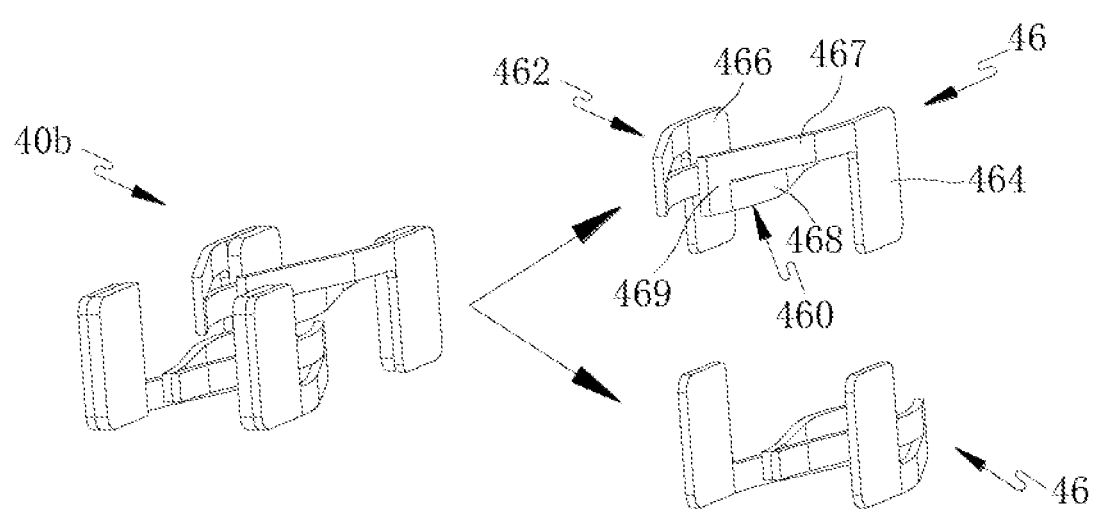
FIG. 6 is a schematic structural view of the elastic support assembly in FIG. 5.

As shown in FIGS. 5 and 6, an elastic support assembly 40b comprises two elastic supports 46 having the same structure. The two elastic supports 46 are likewise arranged symmetrically vertically and in the front-rear direction. A first connection point 464 and a second connection point 466 on the same elastic support 46 are located on the same side of a central axis of the vibrator. The first connection point 464 is coupled at an end of the mass block 30. The second connection point 466 is coupled to a side wall, perpendicular to the vibration direction of the vibrator, of the upper housing 10 (see FIG. 1). The height of the elastic support assembly 40b is identical with the height of the end of the mass block 30, and the height of both the first connection points 464 and the second connection points 466 is identical with the height of the end of the mass block 30. Moreover, the width (i.e., a dimension perpendicular to the vibration direction of the vibrator) of the elastic support assembly 40b is identical with the width of the end of the mass block 30.

As shown in FIG. 6, the elastic support assembly 46 comprises a first elastic arm 460 and a second elastic arm 462, ends of which are connected together. The other end of the first elastic arm 460 is coupled to the first connection point 464. The other end of the second elastic arm 462 is coupled to the second connection point 466. The first elastic arm 460 and the second elastic arm 462 are connected together by welding. Because of coupling by welding, the processing is simpler, and the probability that the elastic support 46 deforms during vibration of the vibrator is reduced, thereby ensuring the elasticity of the elastic support 46.

As shown in FIG. 6, the first elastic arm 460 and the second elastic arm 462 have the same structure and are arranged symmetrically. The first elastic arm 460 (the second elastic arm 462) forms a bend in its middle, that is, the first elastic arm (the second elastic arm) comprises a first haft arm 467 and a second half arm 468. A folding connection point 469 is formed at a connection position of the first half arm 467 and the second half arm 468. The first half arm 467 and the second half arm 468 are integrally connected in a vertically stacked manner at the folding connection point 469. The two first half arms 467 are respectively connected to the first connection point 464 and the second connection point 466. The two second half points 468 are connected together by welding and form an included angle therebetween. In this embodiment, preferably, the included angle is an acute angle. The elastic support 46 is of a structure of an approximate V-shape with a tip bent inwardly.

Embodiment Three

This embodiment is basically the same as Embodiment Two, except that the followings.

Figure 7:
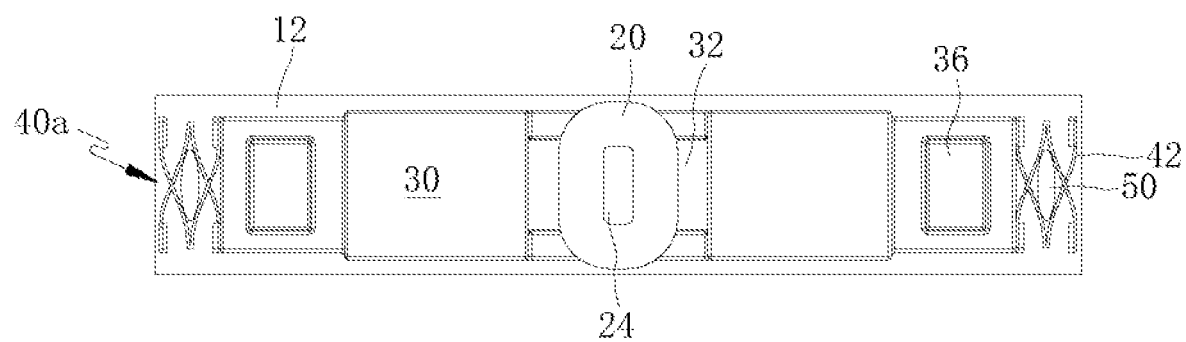
FIG. 7 is an internal schematic structural view of Embodiment Three of the linear vibration motor of the present invention.

As shown in FIG. 7, a damping element 50 is arranged in a space defined by two elastic supports 42 in the same set of elastic support assemblies 40a. The damping element 50 may be made of, but not limited to sponge, silica gel, rubber, foam or the like, and may be made of any material as long as it has a damping effect. The damping element 50 may provide certain assistance during a restoring process of the elastic support 42, shorten the vibration return time of the vibrator and realize rapid reciprocating movement of the vibrator. Thus, the performance of the motor is further improved. Moreover, the vibrator is effectively prevented from collision with the housing. Thus, for the motor, the stability is improved and the service life is prolonged.

As shown in FIG. 7, the damping element 50 may not only be arranged on the inner side of the elastic support assembly 40a as shown in the figure, but may also be arranged between the elastic support assembly 40a and the mass block 30 or between the elastic support assembly 40a and the upper housing 10 (see FIG. 1), or the damping elements 50 may be arranged at two or all of these three positions.

FIG. 7 only shows a schematic structural view of the solution of this embodiment which is basically the same as that of Embodiment One. A schematic structural view of the solution of this embodiment which is basically the same as that of Embodiment two may be obtained by a person skilled in the art according to a combination of other figures and FIG. 7 of the present invention. For this reason, the other figures are omitted here for brevity.

This description only sets forth the technical solution of the present invention by taking the linear vibration motor as an example which comprises two sets of elastic support assemblies each of which two elastic supports. In practical application, the number of the elastic support assemblies is not limited to two sets, the number of the elastic supports comprised in each set of the elastic support assemblies is not limited to two either, and a skilled person may make adjustment according to an internal space of the motor and the structures of other components.

In the present invention, at least two elastic supports having the same structure are assembled into a set of elastic support assemblies, and the elastic support assembly forms at least two connection points with each of the vibrator and the housing. Therefore, the vibration stability and balance of the vibrator are greatly improved while an internal structure of the motor is simplified, the resonant frequency of the motor is reduced and thus the overall performance of the motor is improved.

The above three embodiments only illustrate the technical solution of the present invention that the elastic support assembly consists of two elastic supports, which respectively form at least two connection points with each of the vibrator and the housing. In practical application, the structure of the linear vibration motor is not limited to the structures described in the above embodiments. The technical solution of the present invention may be suitable for linear vibration motors of any structure, which comprise motors of a regular structure and an irregular structure. A person skilled in the art may apply the technical solution of the present invention to linear vibration motors of other structures according to this description without creative efforts. Therefore, no matter if the other structures of linear vibration motors are identical with those in the above embodiments, motor products all fall within the scope of protection of the present invention as long as its elastic support assembly consists of two elastic supports which respectively form at least two connection points with each of the vibrator and the housing so as to simplify the structure of the motor and improve the vibration stability and balance.

The feature naming with sequence numbers (such as first coils and second coils) in this description is only for the purpose of distinguishing technical features and does not represent a position relationship, an assembly sequence and the like between various features.

The present invention is not limited to the above specific embodiments, and variations made by persons of ordinary skill in the art based on the above concept without creative efforts all fall within the protection scope of the present invention.

What is claimed is:
1. A linear vibration motor comprising:
a housing;
a stator;
a vibrator; and
at least two sets of elastic support assemblies which are located at two ends of the vibrator, respectively, and used for supporting the vibrator and providing elastic restoring forces,
wherein:
each set of the elastic support assemblies comprises at least two elastic supports,
each of the elastic supports comprises a first connection point coupled to the vibrator and a second connection point coupled to the housing,
both the first connection point and the second connection point located on the same elastic support are located on a side of a central axis of the vibrator, and the central axis is parallel to a vibration direction of the vibrator,
the second connection point is coupled onto a side wall, perpendicular to the vibration direction of the vibrator, of the housing,
the first connection point is coupled onto a side wall of the vibrator, the side wall being perpendicular to the vibration direction of the vibrator,
each of the at least two sets of elastic support assemblies comprises the at least two elastic supports that have matching structure and are stacked vertically, such that each of the at least two elastic supports are stacked in the vibration direction and a direction perpendicular to the vibration direction,
a state of one elastic support of the at least two elastic supports of one of the at least two sets of elastic support assemblies is also one other elastic support of another of the at least two sets of elastic supports that is turned around the central axis by 180 degrees, and
a make-way space is reserved between the at least two elastic supports.

2. The linear vibration motor according to claim 1, wherein the first connection point is coupled onto a side wall, parallel to the vibration direction of the vibrator, of the vibrator.

3. The linear vibration motor according to claim 1, wherein the elastic supports are elastic sheets or springs.

4. The linear vibration motor according to claim 1, wherein:
the two elastic arms with respective one ends of the respective two ends of each of the two respective elastic arms are integrally connected and the other ends of the respective two ends of each of the two respective elastic arms are respectively coupled to the first connection point and the second connection point,
an included angle between the two elastic arms is an acute angle, and
the two elastic arms have the same structure and are symmetrically arranged.

5. The linear vibration motor according to claim 1, wherein the two elastic arms each comprise a first half arm and a second half arm which are connected together, and the first half arm and the second half arm are connected together in a vertically stacked manner at an interconnection portion of the first and second half arms.

6. The linear vibration motor according to claim 1, wherein connection ends of the two elastic arms are fixedly coupled by welding.

7. The linear vibration motor according to claim 1, wherein a height and a width of each set of the at least two sets of elastic support assemblies are identical to a height and a width of the vibrator.

8. The linear vibration motor according to claim 1, wherein each of the at least two elastic supports is made of a wire of a flat structure, and a longitudinal width of the wire is greater than a transverse width of the wire.

9. The linear vibration motor according to claim 1, wherein a damping element is arranged in a space defined by the at least two elastic supports of the same set of the at least two sets of elastic support assemblies.

10. The linear vibration motor according to claim 1, wherein:
the vibrator comprises at least two adjacent permanent magnets and a magnetic conduction yoke arranged between the two adjacent permanent magnets,
adjacent ends of the two adjacent permanent magnets have matching polarity,
the stator comprises coils and magnetic conduction cores arranged in the coils, and
a magnetization direction of the permanent magnet is perpendicular to an axis of the coil.

11. The linear vibration motor according to claim 10, wherein:
   the magnetic conduction yoke and the magnetic conduction cores are staggered, and
   a horizontal distance between the magnetic conduction yoke and the magnetic conduction cores corresponding to the magnetic conduction yoke is 0.1-0.3 mm.

* * * * *